(12) United States Patent
Ikeda

(10) Patent No.: US 6,789,591 B2
(45) Date of Patent: Sep. 14, 2004

(54) PNEUMATIC TIRE

(75) Inventor: Akio Ikeda, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/729,171

(22) Filed: Dec. 5, 2000

(65) Prior Publication Data

US 2001/0002604 A1 Jun. 7, 2001

(30) Foreign Application Priority Data

Dec. 7, 1999 (JP) ............................................. 11-348064

(51) Int. Cl.$^7$ ......................... B60C 13/00; B60C 13/02
(52) U.S. Cl. ........................ 152/523; 152/454; 152/539; 264/326; 425/28.1; 425/812; 249/141
(58) Field of Search ................. 152/451, 523, 152/524, 539; 264/326, 134, 36.14, 299, 328.3, 501; 425/812, 28.1; 249/141

(56) References Cited

U.S. PATENT DOCUMENTS

| | | | |
|---|---|---|---|
| 3,399,257 A | * | 8/1968 | Ueno .......................... 152/523 |
| 4,279,286 A | * | 7/1981 | Merli et al. .................. 152/523 |
| 4,343,342 A | | 8/1982 | McDonald |
| 4,947,913 A | * | 8/1990 | Kaba et al. .................. 152/454 |

FOREIGN PATENT DOCUMENTS

| | | | |
|---|---|---|---|
| DE | 3625226 | * | 3/1987 |
| FR | 1138358 | | 6/1957 |
| GB | 207156 | | 1/1924 |
| JP | 61081207 | | 4/1986 |
| JP | 02088310 | * | 3/1990 |
| JP | 05178013 | * | 7/1993 |
| JP | 04233041 | * | 3/1994 |
| JP | 60128006 | * | 7/1995 |

* cited by examiner

Primary Examiner—Jeff H. Aftergut
Assistant Examiner—Justin Fischer
(74) Attorney, Agent, or Firm—Birch, Stewart, Kolasch & Birch, LLP (57) ABSTRACT

A pneumatic tire comprises a tread portion, a pair of sidewall portions, a pair of bead portions each with a bead core and a bead apex therein, each sidewall portion provided on the outer face with means of escaping air between the tire and a mold for vulcanizing the tire, wherein the air escape means comprises a circumferentially extending vent emboss line disposed adjacently to a radially outer end of the bead apex and a circumferentially extending vent groove adjoining the radially outside of the vent emboss line and having a depth of at least 0.15 mm. Preferably, the vent groove has a width of from 5 to 10 mm and a depth of from 0.2 to 0.5 mm, and the vent emboss line and vent groove are disposed in a lower sidewall region having a substantially straight profile. The bottom of the vent groove may be substantially parallel to the straight profile of the lower sidewall region and the bottom may be provided with emboss marks.

12 Claims, 6 Drawing Sheets

PNEUMATIC TIRE

The present invention relates to a pneumatic tire, more particularly to an improvement in a lower sidewall portion being capable of preventing the occurrence of bareness of rubber on the tire outer face.

When a green tire is put in a vulcanizing mold and inflated to press the outer face of the tire against the inner face of the mold, the contact between the two faces is liable to delay near the radially outer end of a bead apex because the bead portion is relatively stiff. In such a portion, therefore, air between the tire and mold is liable to remain and as a result, bareness of rubber is liable to occur on the outer face of the finished tire.

In order to cause escape of air between a tire and mold, conventionally vent hole are provided at corresponding portions of the mold. However, the portions in which vent holes are necessary vary depending on tire components such as a hard rubber bead apex, carcass ply turnup, reinforcing cord layer and the like. Therefore, if positional unevenness of the end or edge of such tire component is large, air cannot be fully removed. Further, a more important point is that the mold cost is very high. If the internal structure of the tire is changed for some reason and the position of the end or edge of a tire component is accordingly changed, it is necessary to remake the mold.

Figure 6:
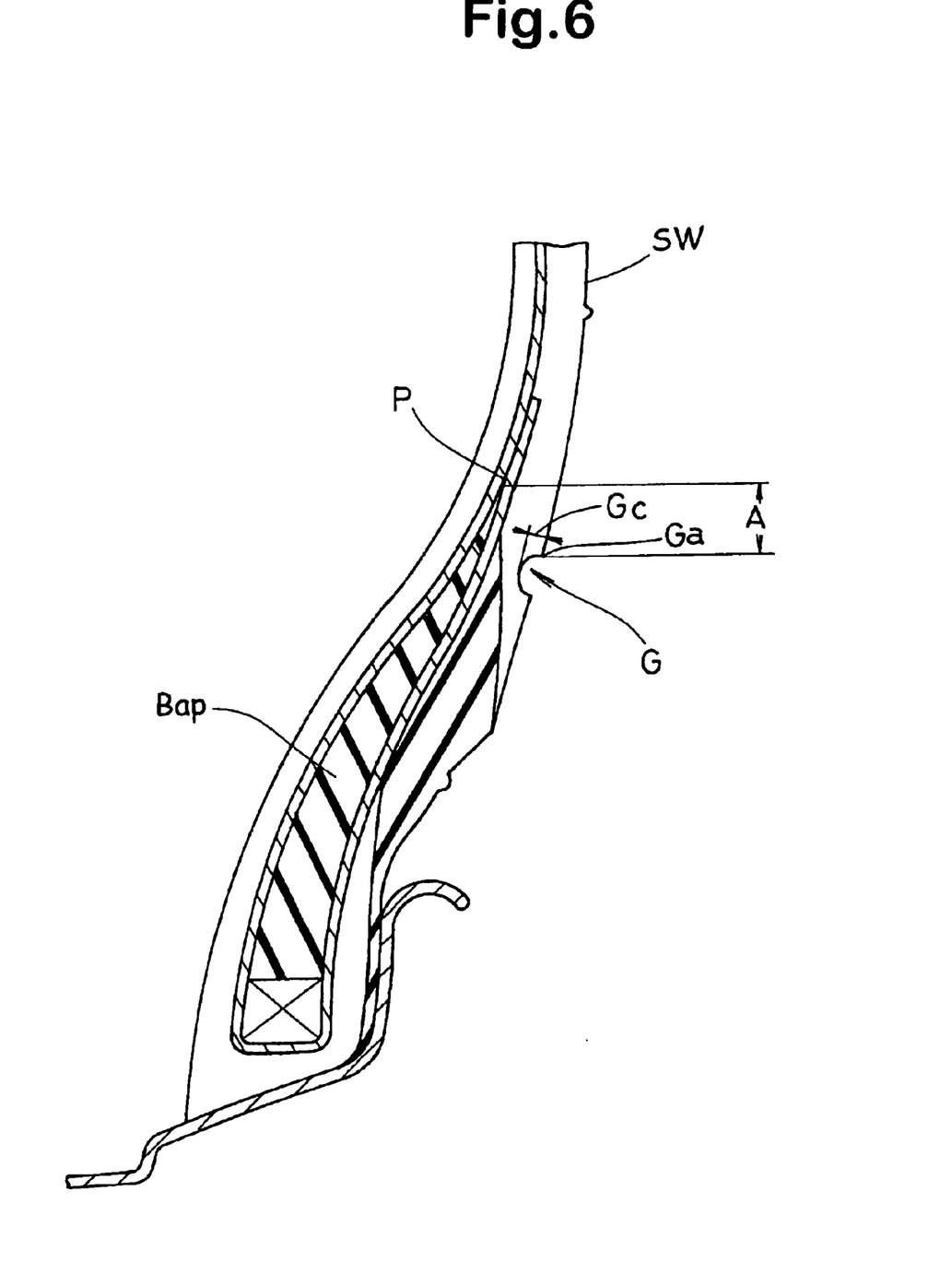
FIG. 6 is a cross sectional view showing the prior art.

In Japanese patent No. 2872920, a radial tire is disclosed wherein as shown in FIG. 6, the convexly curved outer face of the tire sidewall portion SW is provided with a circumferentially extending groove G to prevent bareness of rubber. This groove G has a width of from 2 to 10 mm and a depth of from 0.5 to 1.5 mm, and the position of the groove G is such that the distance (A) measured radially inwardly from the radially outer end P of a bead apex Bap to the radially outer edge Ga of the groove G is in a range of from 0 to 7 mm. Although this groove G is effective, in order to prevent bareness of rubber without fail, an increase in the size especially depth Gc of the groove is unavoidable. As a result, the appearance and strength of the tire are liable to become worse.

It is therefore, an object of the present invention to provide a pneumatic tire in which the occurrence of bareness of rubber near the radially outer end of a bead apex is effectively prevented without affecting the appearance and strength of the tire, and further the occurrence can be prevented even if the position of the end or edge of a tire component is changed intentionally or not.

According to the present invention, a pneumatic tire comprises
   a tread portion,
   a pair of sidewall portions,
   a pair of bead portions with a bead core and a bead apex therein,
   each of the sidewall portions provided on the outer face with means of escaping air between the tire and a mold for vulcanizing the tire, which means comprises
   a circumferentially extending vent emboss line disposed adjacently to a radially outer end of the bead apex and
   a circumferentially extending vent groove adjoining the radially outside of the vent emboss line and having a depth of at least 0.15 mm.

Preferably, the vent emboss line and vent groove are disposed in a lower sidewall region having a substantially straight profile in a tire meridian section which region extends radially inwardly from a position radially inside the maximum tire section width point towards the bead portion. And, the bottom of the vent groove is substantially parallel to this straight profile of the lower sidewall region and is provided with emboss marks.

An embodiment of the present invention will now be described in detail in conjunction with the accompanying drawings.

Figure 1:
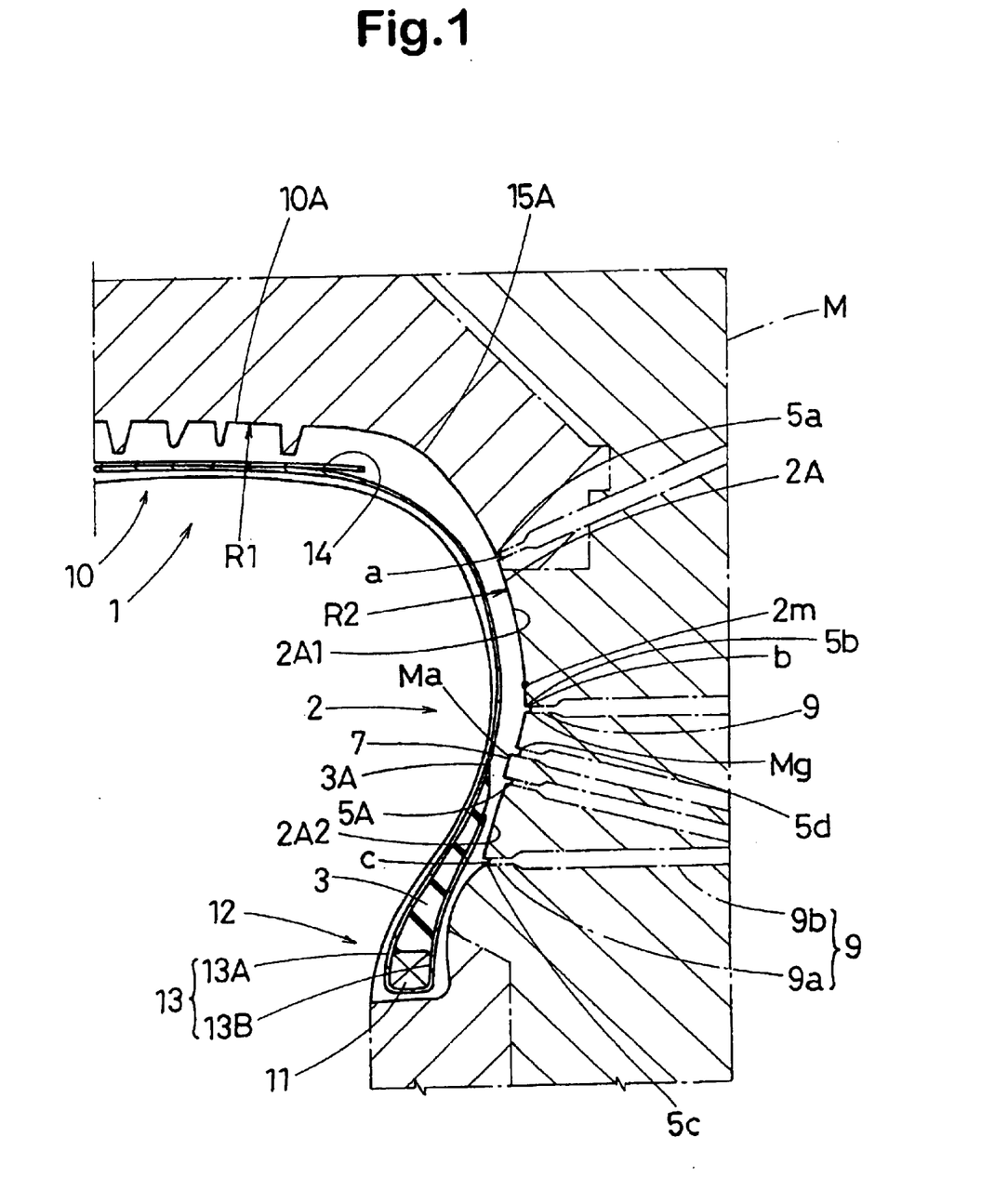
FIG. 1 is a cross sectional view showing a tire and a mold according to the present invention.

In FIG. 1, pneumatic tire 1 according to the present invention is put in a tire vulcanizing mold M.

The pneumatic tire 1 comprises a tread portion 10, a pair of sidewall portions 2, a pair of bead portions 12 with a bead core 11 and a rubber bead apex 3 therein, a carcass 13 extending between the bead portions 12, and a belt 14 disposed radially outside the carcass 13 in the tread portion 10.

In this embodiment, the tire 1 is a radial tire having an aspect ratio in a range of not more than 70%.

The carcass 13 comprises at least one ply of cords extending between bead portions 12 through the tread portion 10 and sidewall portions 2, and turned up around the bead core 11 in each bead portion to form a pair of turned up portions 13B and a main portion 13A therebetween. Thereby, the bead core 11 and bead apex 3 are wrapped in the carcass ply, and the bead apex 3 is sandwiched between each turned up portion 13B and the main portion 13A.

The bead apex 3 is made of hard rubber having a hardness of from 68 to 90 when measured in the tire radial direction with a type-A durometer according to Japanese Industrial Standard K6253. In this example, the bead apex 3 extends radially outwardly from the bead core 11 while tapering toward its radially outer end 3A which is positioned at a radial height H3 in a range of from 60 to 80%, preferably 65 to 75% of the radial height H of the maximum section width point 2m of the tire.

At the outer end 3A of the bead apex 3, the thickness T1 of sidewall rubber measured from the outer end 3A to the tire outer face 2A normally thereto is set in a range of from 2.5 to 6.5 mm. If less than 2.5 mm, bareness of rubber is liable to occur. If more than 6.5 mm, the tire weight increases.

In this application, the "radial height" or more simply "height" means a height measured in a radial direction of the tire from the bead base line B when the tire is mounted on a standard rim and inflated to a standard pressure but loaded with no tire load. The "maximum section width point" is also determined under such condition. The bead base line B is an axial line drawn at a radial position corresponding to the rim diameter of the standard wheel rim. The "tread edges" means axially outermost edges of the ground contacting region of the tire which is mounted on the standard rim and inflated to the standard pressure and loaded with the standard tire load. Here, the standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. In case of passenger car tires, however, 200 kPa is used as the standard pressure. The standard load is the "maximum load capacity" in JATMA, 70% of the "Load Capacity" in ETRTO, the maximum value given in the above-mentioned table in TRA or the like.

A profile of the finished tire under an inflation pressure of 5% of the standard pressure or a profile of the tire in the vulcanization mold M or is as follows: a tread profile 10A between the tread edges is convexly curved such that the radius R1 of curvature gradually decreases from the tire equator towards the tread edges; an upper sidewall profile 2A1 extending radially inwardly from a point (a) to a point (b) has a substantially single radius of curvature R2; a lower sidewall profile 2A2 extending from the point (b) to a point (c) is substantially straight; and a bead profile 12A extending radially inwardly from the point (c) is curved concavely to accommodate a curved flange of the wheel rim, wherein the point (b) is set at a radial height Hb in a range of from 85 to 98% of the height H of the maximum tire section width point 2m, and the point (c) is set at a radial height Hc in a range of from 30 to 50% of the height H, and more than the height of the rim flange. Further, a shoulder profile 15A between the tread edge and the point (a) is curved not to form an inflection point with respect to the tread profile 10A and upper sidewall profile 2A1. However, the upper sidewall profile 2A1 intersects the lower sidewall profile 2A2 at the point (b) with an obtuse angle. Thus, the point (b) is an inflection point. Further, the lower sidewall profile 2A2 intersect the bead profile 12A at the point (c) with an obtuse angle. Thus, the point (c) is also an inflection point. Here, the above-mentioned "substantially straight" lower sidewall profile 2A2 means that the deviation from a straight line drawn between the points (b) and (c) is less than about ⅕ of the maximum distance A1 between this straight line and an arc line drawn between the points (b) and (c) not to form an inflection point with respect to each of the upper sidewall profile 2A1 and bead profile 12A.

Figure 2:
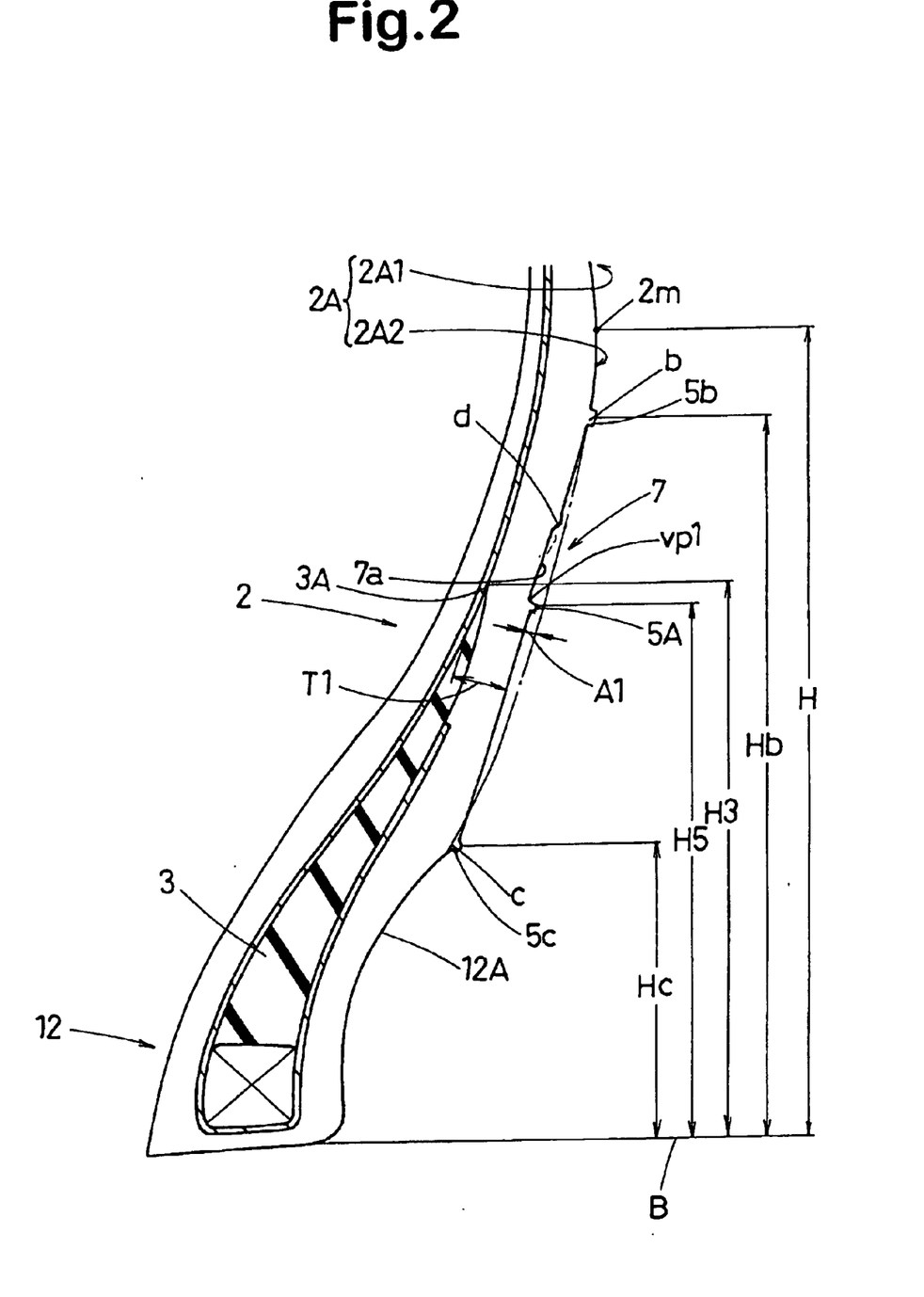
FIG. 2 is a cross sectional view of the lower sidewall portion and bead portion of the tire.

FIG. 2 shows the lower sidewall portion of the vulcanized tire took out from the mold M. As shown in this figure, for the purpose of escaping air between the tire and mold, the outer face 2A of the sidewall portion 2 is provided near the radially outer end 3A of the bead apex 3 with a circumferentially extending vent emboss line 5A and further a circumferentially extending vent groove 7 adjoining the vent emboss line 5A on the radially outside thereof.

The cross sectional shape of the vent emboss line 5A is a trapezoid in this embodiment. But, various shapes, e.g. rectangle, triangle (V-shape), U-shape or the like can be used.

The width (vw) of the vent emboss line 5A which is measured in the tire radial direction along the inclining direction of the tire outer surface is set in a range of from 0.2 to 2.0 mm.

The position of the vent emboss line 5A is such that the radial height H5 of the center of the vent emboss line 5A in its widthwise direction is within a radial height range of from H3+3 mm to H3−10 mm, wherein H3 is the height of the bead apex 3 as explained above. The height H3−about 3 to 6 mm will be most desirable.

The protruding height (vh) of the vent emboss line 5A is set in a range of from 0.3 to 2.5 mm when measured on the radially inside thereof. However, as the vent groove 7 adjoins the vent emboss line 5A on the radially outside thereof, if the height of the vent emboss line 5A is measured on the radially outside thereof, it is larger than (vf) by a depth of the vent groove 7.

The vent groove 7 has a width 7W in a range of from 5 to 10 mm, preferably 5 to 8 mm when measured in the tire radial direction along the inclination of the sidewall outer face 2A. The depth 7D of the vent groove 7 measured from the upper sidewall profile 2A2 is set in a range of from 0.15 mm to 0.5 mm, preferably 0.2 to 0.4 mm.

If the depth 7D is less than 0.15 mm, bareness of rubber is liable to occur. If the depth 7D is more than 0.5 mm, the radially outer end 3A of the bead apex 3 appears on the tire outer face as a circumferentially extending line. If the width 7W is more than 10 mm, the strength of the sidewall portion 2 decreases and the tire looks unattractive. If the width 7W is less than 3 mm, bareness of rubber is caused by unevenness or change in height of the radially outer end 3A of the bead apex 3.

Figure 3:
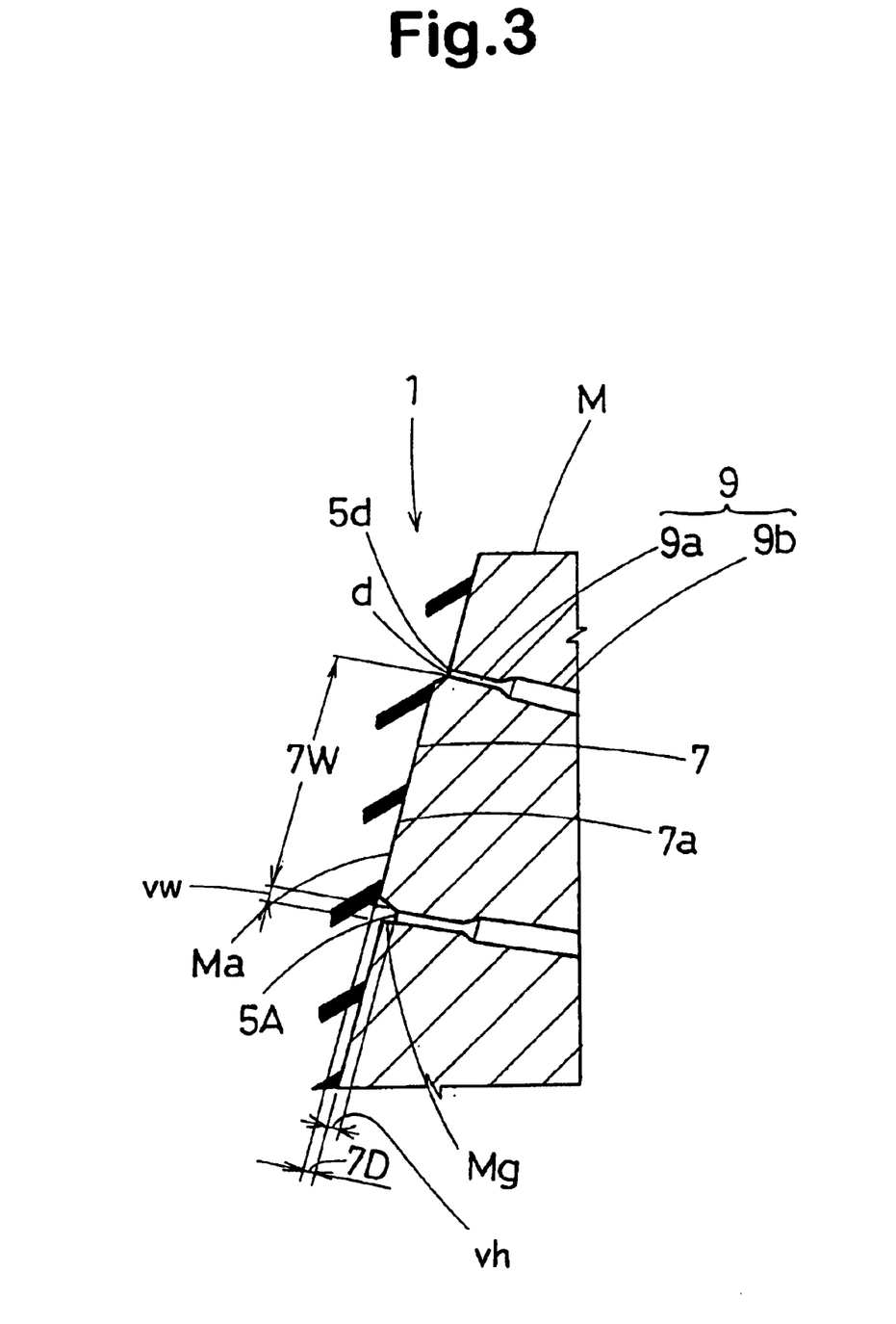
FIG. 3 is an enlarged cross sectional view showing the vent groove and line thereof.

As shown in FIG. 3, the bottom 7a of the vent groove 7 which has a width almost same but slightly less than the width 7W is substantially parallel to the straight line (b–c) of the lower sidewall profile 2A2. The "substantially parallel" means that the depth 7D tolerates a difference of up to 0.1 mm between the radially outer end and inner end of the bottom 7a. In case there is such a difference, it is preferable that the radially inner end is shallower than the radially outer end.

Figure 4:
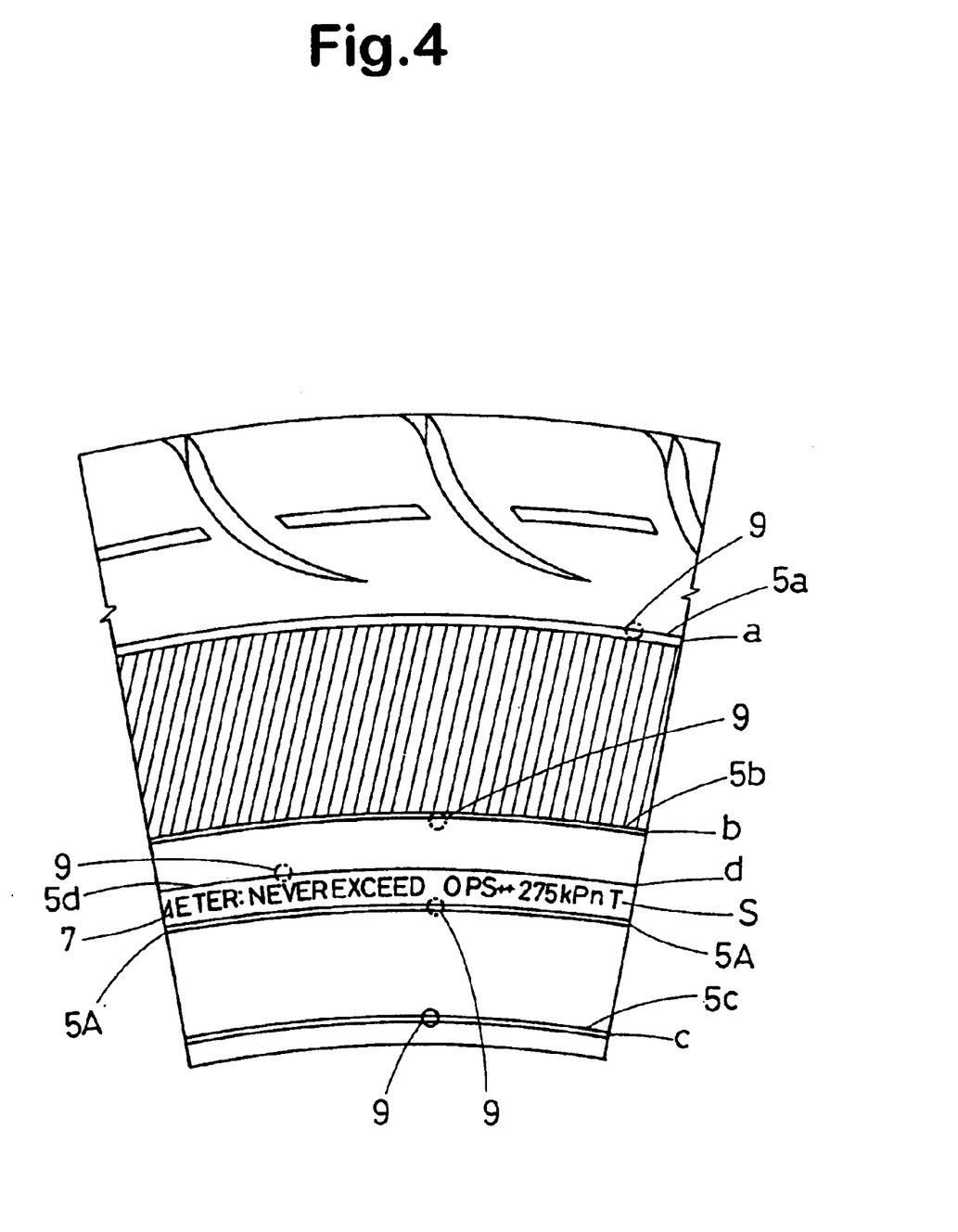
FIG. 4 is a partial side view of the tire.

As shown in FIG. 4, the groove bottom 7a is preferably provided with emboss marks S such as letters, diagrams and the like along at least 50% more preferably 100% or the entire length thereof. Therefore, even if the above-mentioned air escaping measures can not prevent the occurrence of bareness of rubber, the bareness of rubber becomes unnoticeable due to the emboss marks S.

In this embodiment, further, vent emboss lines 5a, 5b and 5c similar to the above-mentioned vent emboss line 5A are formed at the above-mentioned points (a), (b) and (c).

On the other hand, according to the above-mentioned vent emboss lines and vent grooves, the vulcanization mold M is provided with a groove Mg for forming each of the vent emboss lines, and a circumferentially extending protrusion for forming each of the vent grooves. Further, from each of the grooves Mg, vent holes 9 extend to the outside of the mold. The number of the vent holes 9 around the tire is set in a range of from 3 to 20, usually 6 to 12 per one groove Mg.

Figure 5A:
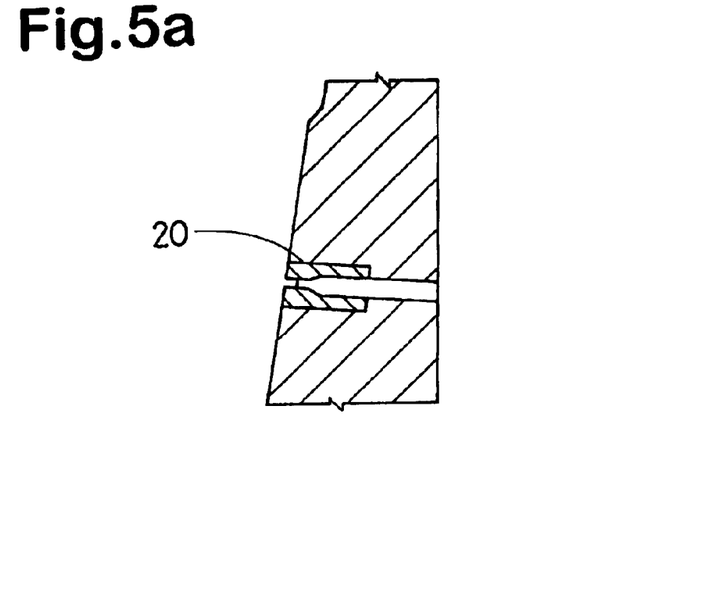
FIG. 5A is a cross sectional view showing a vent piece which is mounted on the mold.
Figures 5B, 5C, 5D, 5E:
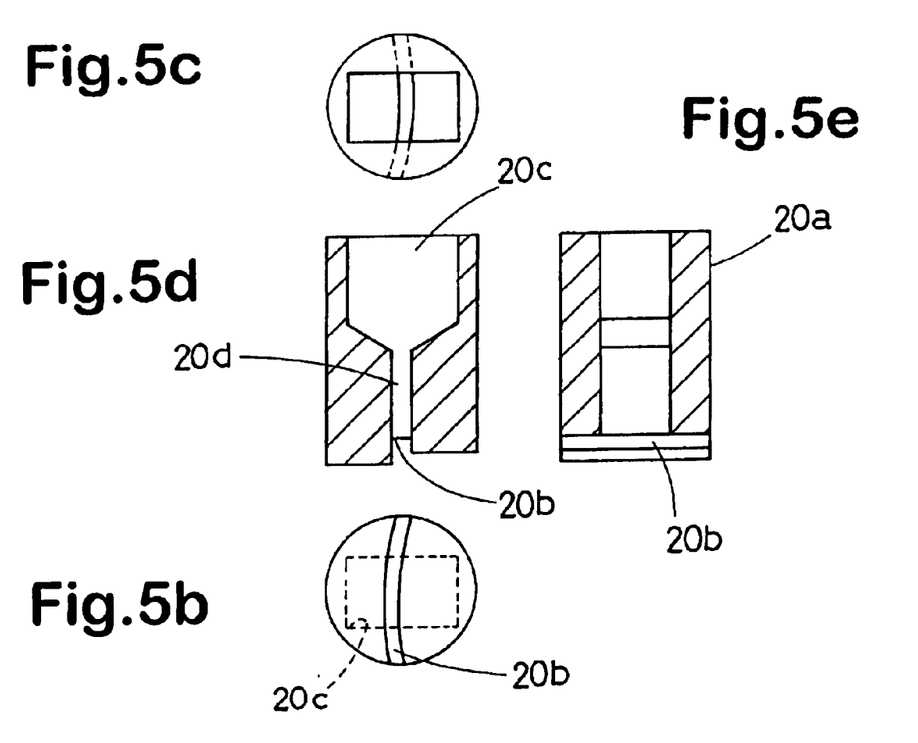
FIG. 5B is a back view of the vent piece.
FIG. 5C is a front view of the vent piece.
FIG. 5D is a cross sectional view taken along a front groove.
FIG. 5E is a cross sectional view taken along a normal direction to the front groove.

The vent hole 9 may be formed by drilling the mold material. In such case, the vent hole 9 is preferably formed as a stepped hole comprising an inside part 9a having a small diameter of from 0.5 to 3.0 mm dia. and an outside part 9b having a larger diameter. It is however, more desirable that the vent hole 9 is formed by using a vent piece 20 mounted in the shaping face of the mold as shown in FIG. 5a. The vent piece 20 is, as shown in FIGS. 5b to 5e, provided at the inner end of its cylindrical main body 20a with a groove 20b forming a part of the above-mentioned groove Mg of the mold. Accordingly, the groove 20b is curved with the same radius of curvature as the vent emboss line 5 and has the same width as the vent emboss line 5. On the outside of the groove 20b, a large hole 20c which is connected to the groove 20b by a small hole 20d is formed.

As described above, in the present invention, as the tire sidewall portion is provided with both the vent emboss line and vent groove, the occurrence of bareness of rubber can be effectively prevented without using a deep groove in the prior art. Therefore, the deterioration of the appearance and strength of the tire can be prevented. Further, even if the position of the end or edge of a tire component such as bead apex is somewhat changed, the occurrence of bareness of rubber can be effectively prevented. Further, by providing the vent line and groove in the lower sidewall region having a substantially straight profile, the air is certainly guided to the vent line. Thus the prevention of bareness of rubber is enhanced.

What is claimed is:

1. A pneumatic tire comprising
   a tread portion,
   a pair of sidewall portions,
   a pair of bead portions each with a bead core and a bead apex therein,
   each said sidewall portion provided on the outer face with means of escaping air between the tire and a mold for vulcanizing the tire,
   said means comprising
      a circumferentially extending, axially outwardly protruding vent emboss line disposed adjacently to a radially outer end of the bead apex and
      a circumferentially continuously extending vent groove adjoining the radially outside of the vent emboss line,
   wherein a radial distance of the vent emboss line from the radially outer end of the bead apex is in a range of from +3 mm to −10 mm,
   the sidewall portions each provided with a lower sidewall region having a substantially straight profile in a meridian section of a finished tire under inflation pressure of 5% of the standard pressure or a tire in the vulcanization mold, wherein said profile extends radially inwardly from an originating position (b) radially inside the maximum tire section width point towards the bead portion to a terminating position (c) wherein the position (b) is at a radial height (Hb) in a range of from 85 to 98% of the radial height (H) of the maximum tire section width point, and the position (c) is at a radial height (Hc) in a range of from 30 to 50% of said radial height (H), and
   said vent emboss line and vent groove disposed within said lower sidewall region so that a part of the lower sidewall region having a positive extent is left on the radially outside of said vent groove and the radially inside of said vent emboss line,
   the vent groove having a width in a range of from 5 to 10 mm and a depth in a range of from 0.15 mm to 0.5 mm from the straight profile, and
   the vent emboss line having a protruding height in a range of from 0.3 mm to 2.5 mm from the straight profile.

2. The pneumatic tire according to claim 1, wherein the bottom of the vent groove is substantially parallel to the straight profile of the lower sidewall region and is provided with emboss marks.

3. The pneumatic tire according to claim 1, wherein
   a circumferentially extending vent emboss line is disposed at the radially inner edge of said lower sidewall region.

4. The pneumatic tire according to claim 1, wherein
   a circumferentially extending vent emboss line is disposed at the radially outer edge of said lower sidewall region.

5. The pneumatic tire according to claim 1, wherein the bead apex is made of hard rubber having a hardness of from 68 to 90 when measured in the tire radial direction with a type-A durometer according to Japanese Industrial Standard K6253.

6. The pneumatic tire according to claim 1, wherein the bead apex extends radially outwardly from the bead core while tapering toward its radially outer end, which is positioned at a radial height (H3) in a range of from 60 to 80% of the radial height (H) of the maximum section width point of the tire.

7. The pneumatic tire according to claim 1, wherein the sidewall rubber thickness (T1) measured from the radially outer end of the bead apex to the tire outer face normally thereto is in a range of from 2.5 to 6.5 mm.

8. The pneumatic tire according to claim 6, wherein the sidewall rubber thickness (T1) measured from the radially outer end of the bead apex to the tire outer face normally thereto is in a range of from 2.5 to 6.5 mm.

9. A pneumatic tire comprising
   a tread portion,
   a pair of sidewall portions,
   a pair of bead portions each with a bead core and a bead apex therein,
   each said sidewall portion provided on the outer face with means of escaping air between the tire and a mold for vulcanizing the tire,
   said means comprising
      a circumferentially extending, axially outwardly protruding vent emboss line disposed adjacently to a radially outer end of the bead apex and
      a circumferentially continuously extending vent groove adjoining the radially outside of the vent emboss line,
   wherein a radiai distance of the vent emboss line from the radially outer end of the bead apex is in a range of from +3 mm to −10 mm,
   the sidewall portions each provided with a lower sidewall region having a substantially straight profile in a meridian section of a finished tire under inflation pressure of 5% of the standard pressure or a tire in the vulcanization mold, wherein said profile extends radially inwardly from an originating position (b) radially inside the maximum tire section width point towards the bead portion to a terminating position (c) wherein the position (b) is at a radial height (Hb) in a range of from 85 to 98% of the radial height (H) of the maximum tire section width point, and the position (c) is at a radial height (Hc) in a range of from 30 to 50% of said radial height (H), and
   said vent emboss line and vent groove disposed within said lower sidewall region so that a part of the lower sidewall region having a positive extent is left on the radially outside of said vent groove and the radially inside of said vent emboss line,
   the vent groove having a width in a range of from 5 to 10 mm and a depth in a range of from 0.15 mm to 0.5 mm from the straight profile, and
   the vent emboss line having a protruding height in a range of from 0.3 mm to 2.5 mm from the straight profile, wherein the bead apex is made of hard rubber having a hardness of from 68 to 90 when measured in the tire radial direction with a type-A durometer according to Japanese Industrial Standard K6253.

10. The pneumatic tire according to claim 9, wherein bead apex extends radially outwardly from the bead core while tapering toward its radially outer end, which is positioned at a radial height (H3) in a range of from 60 to 80% of the radial height (H) of the maximum section width point of the tire.

11. The pneumatic tire according to claim 5, wherein the sidewall rubber thickness (T1) measured from the radially outer end of the bead apex to the tire outer face normally thereto is in a range of from 2.5 to 6.5 mm.

12. The pneumatic tire according to claim 10, wherein the sidewall rubber thickness (T1) measured from the radially outer end of the bead apex to the tire outer face normally thereto is in a range of from 2.5 to 6.5 mm.

* * * * *